United States Patent

[11] 3,569,956

[72] Inventors T. O. Paine
Acting Administrator of the National Aeronautics and Space Administration with respect to an invention of;
James O. Duffy, Pasadena, Calif.

[21] Appl. No. 771,760
[22] Filed Oct. 30, 1968
[45] Patented Mar. 9, 1971

[54] MINIMAL LOGIC BLOCK ENCODER
10 Claims, 8 Drawing Figs.

[52] U.S. Cl. .......... 340/347
[51] Int. Cl. .......... H03k 13/24
[50] Field of Search .......... 340/347; 179/15 (OR), (SIG), (APC), (ASYNC); 235/92 (70)

[56] References Cited
UNITED STATES PATENTS

| | | | |
|---|---|---|---|
| 3,025,350 | 3/1962 | Lindner .......... | 179/15(O) |
| 3,030,614 | 4/1962 | Lehan et al. .......... | 340/347X |
| 3,413,452 | 11/1968 | Schlein .......... | 235/92 |

OTHER REFERENCES

W. Peterson, Error-Correcting Codes, 1961, pp: 73— 77; M. I. T. Press.

S. Golomb, Digital Communications: With Space Applications; " Introduction to Digital Communications," Prentice-Hall, 1964, pp: 8— 13.

*Primary Examiner*—Maynard R. Wilbur
*Assistant Examiner*—Michael K. Wolensky
*Attorneys*—J. H. Warden, Monte F. Mott and G. T. McCoy

ABSTRACT: An encoder incorporating a minimum number of logic circuits to convert 64 6-bit data words into 64 32-bit code words, forming a 32, 6 biorthogonal code. Each code bit, generated during a multiclock-period-code-bit-period, is logically combined, at the end of the code bit period, with a code bit of a comma free vector code to produce a code bit of a code word in a 32, 6 comma free biorthogonal code. The encoder implements an algorithm in accordance to which each of the six data word bits is incorporated in a modulo-2 summation, as a function of the code-bit number and number of logic ones in the code-bit number in binary form.

INVENTOR.
JAMES O. DUFFY
BY [signature]
ATTORNEYS

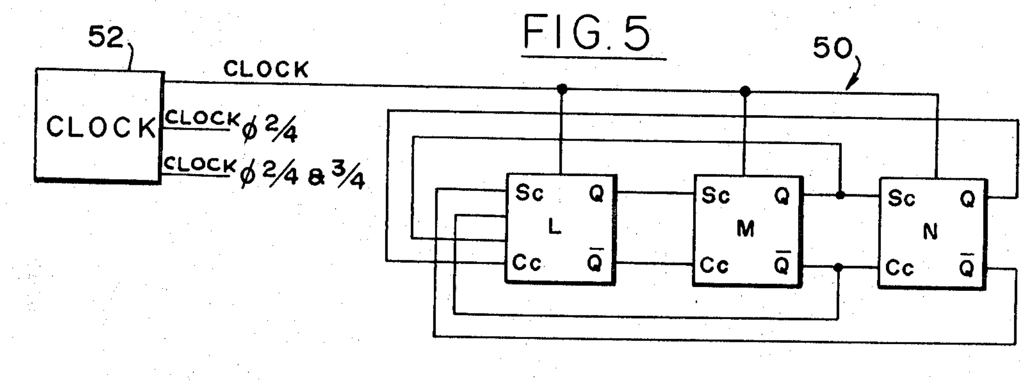
FIG. 5
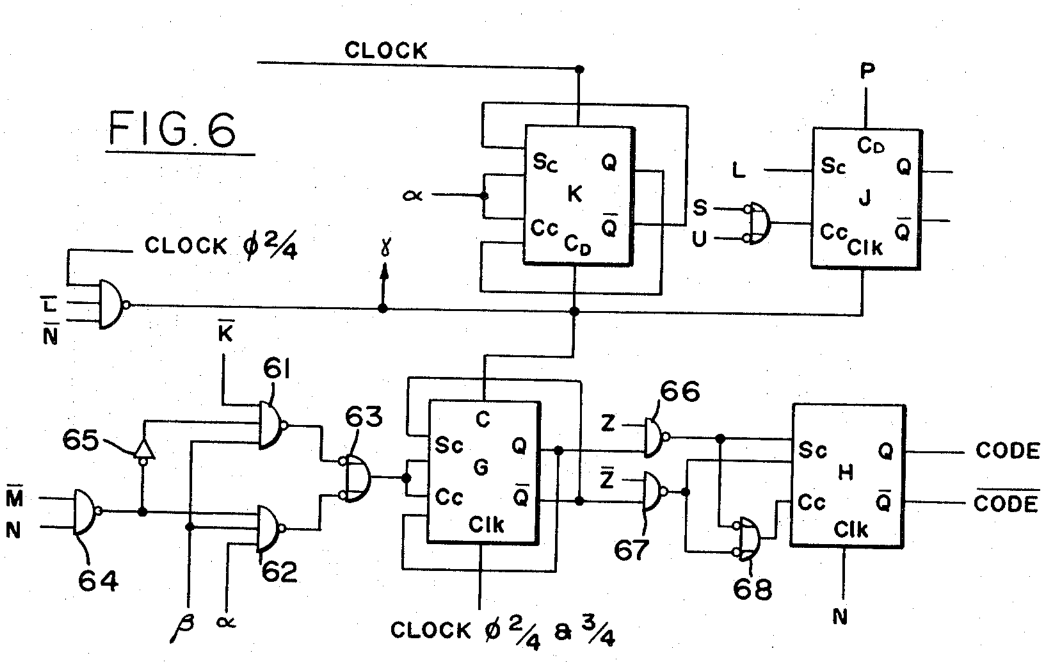
FIG. 6
| LMN | F | E | D | C | B | A | U | T | S | R | P |
|---|---|---|---|---|---|---|---|---|---|---|---|
| 0 0 0 | MSB | | | | | LSB | MSB | | | | LSB |
| 1 0 0 | LSB | MSB | | | | | LSB | MSB | | | |
| 1 1 0 | | LSB | MSB | | | | | LSB | MSB | | |
| 1 1 1 | | | LSB | MSB | | | | | LSB | MSB | |
| 0 1 1 | | | | LSB | MSB | | | | | LSB | MSB |
| 0 0 1 | | | | | LSB | MSB | | | | LSB | MSB |
FIG. 7
INVENTOR.
JAMES O. DUFFY
BY [signature]
ATTORNEYS

PATENTED MAR 9 1971 3,569,956

FIG. 8

| L | M | N | I | U | T | S | R | P | CODE BIT NO. |
|---|---|---|---|---|---|---|---|---|---|
| 0 | 0 | 0 | 1 | 0 | 0 | 0 | 0 | 0 | = 0 |
| 1 | 0 | 0 | 0 | 1 | 0 | 0 | 0 | 0 | |
| 1 | 1 | 0 | 0 | 0 | 1 | 0 | 0 | 0 | |
| 1 | 1 | 1 | 0 | 0 | 0 | 1 | 0 | 0 | |
| 0 | 1 | 1 | 0 | 0 | 0 | 0 | 1 | 0 | |
| 0 | 0 | 1 | 0 | 0 | 0 | 0 | 1 | 0 | |
| 0 | 0 | 0 | 1 | 0 | 0 | 0 | 0 | 1 | = 1 |
| 1 | 0 | 0 | 1 | 0 | 0 | 0 | 0 | 0 | |
| 1 | 1 | 0 | 0 | 1 | 0 | 0 | 0 | 0 | |
| 1 | 1 | 1 | 0 | 0 | 1 | 0 | 0 | 0 | |
| 0 | 1 | 1 | 0 | 0 | 0 | 1 | 0 | 0 | |
| 0 | 0 | 1 | 0 | 0 | 0 | 1 | 0 | 0 | |
| 0 | 0 | 0 | 1 | 0 | 1 | 1 | 1 | 0 | = 14 |
| 1 | 0 | 0 | 0 | 1 | 0 | 1 | 1 | 1 | |
| 1 | 1 | 0 | 1 | 1 | 1 | 0 | 1 | 1 | |
| 1 | 1 | 1 | 1 | 1 | 1 | 1 | 0 | 1 | |
| 0 | 1 | 1 | 1 | 1 | 1 | 1 | 1 | 0 | |
| 0 | 0 | 1 | 1 | 1 | 1 | 1 | 1 | 0 | |
| 0 | 0 | 0 | 1 | 1 | 1 | 1 | 1 | 0 | = 30 |
| 1 | 0 | 0 | 0 | 1 | 1 | 1 | 1 | 1 | |
| 1 | 1 | 0 | 0 | 1 | 1 | 1 | 1 | 1 | |
| 1 | 1 | 1 | 0 | 1 | 1 | 1 | 1 | 1 | |
| 0 | 1 | 1 | 0 | 1 | 1 | 1 | 1 | 1 | |
| 0 | 0 | 1 | 0 | 1 | 1 | 1 | 1 | 1 | |
| 0 | 0 | 0 | 1 | 1 | 1 | 1 | 1 | 1 | = 31 |
| 1 | 0 | 0 | 1 | 0 | 1 | 1 | 1 | 1 | |
| 1 | 1 | 0 | 1 | 0 | 0 | 1 | 1 | 1 | |
| 1 | 1 | 1 | 1 | 0 | 0 | 0 | 1 | 1 | |
| 0 | 1 | 1 | 1 | 0 | 0 | 0 | 0 | 1 | |
| 0 | 0 | 1 | 1 | 0 | 0 | 0 | 0 | 1 | |
| 0 | 0 | 0 | 1 | 0 | 0 | 0 | 0 | 0 | = 0 |

INVENTOR.
JAMES O. DUFFY
BY Monte F. Mott
James & Coy
ATTORNEYS

MINIMAL LOGIC BLOCK ENCODER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention relates to encoders and, more particularly, to an encoder for generating a *n*, *m* biorthogonal code, where $n=2^{(m-1)}$ with a minimum of logic circuitry.

2. Description of the Prior Art

The relative merits of block encoding for a digital communication channel are well known. Briefly, to decrease communication error due to noise, multibit data words are transmitted as multibit code words, where the number of bits of each code word is significantly greater than the number of bits of the corresponding data word. Herebefore, in some of the space exploration communicative applications, biorthogonal and comma free biorthogonal codes have been generated by appropriate encoders in order to transmit 6-bit data words as 32-bit code words.

In designing an encoder for such purposes, as well as in designing other logic circuitry, designers often strive to minimize the conceptual complexity of the implementation, often at the price of an increased number of required elements such as logic gates and related components. Such a design may be thought of as one employing a brute force approach. For space exploration applications however, where weight and size are often of primary consideration, circuits with fewer elements are generally desired even at the price of increased complexity. The present invention is directed to provide encoders, designed to generate a comma free biorthogonal Reed-Muller type code, by means of which 64 6-bit data words are converted for communication purposes into 64 32-bit code words.

OBJECTS AND SUMMARY OF THE INVENTION

It is primary object of the present invention to provide a new encoder for generating a comma free *n*, *m* biorthogonal code, where $n=2^{(m-1)}$.

Another object of the present invention is the provision of an encoder incorporating a reduced number of logic elements as compared with other encoders designed to generate a comma free 32, 6 biorthogonal code.

A further object of the present invention is to provide novel circuitry for generating bits of code words of a biorthogonal code with a minimum of logic elements.

These and other objects of the invention are achieved by providing circuitry, incorporating a minimum number of logic elements, to serially generate the bits of a code word as a function of the bits of the data word which the code word is to represent and the number of the code bit in the code word. Briefly, the circuitry implements an algorithm which was discovered during a thorough analysis of the 32, 6 biorthogonal code. Based on this algorithm, the logic circuitry operates during each of six successive clock periods, defining a code-bit period, to provide an output which is either a one (1) or a binary zero (0), depending on the bits of the data word and the number in binary form of the code bit, in the 32-bit code word. The code bit is then logically combined with a bit of a comma free vector code, generated by an appropriate code generator to produce the desired code bit of a code word of a comma free 32, 6 biorthogonal code.

The novel features of the invention are set forth with particularity in the appended claims. The invention will best be understood from the following description when read in conjunction with the accompanying drawings.

BRIEF DESCRIPTION OF THE DRAWINGS

FIGS. 2 through 6 are logic block diagrams of a specific embodiment of the invention;

FIG. 7 is a table useful in explaining the content of stages of registers shown in FIGS. 2, 3 and 5 during six clock periods, defining each code bit period; and FIG. 8 is a table useful in explaining the counting operation performed by the circuitry of FIG. 3.

DESCRIPTION OF THE PREFERRED EMBODIMENTS

Figure 2:
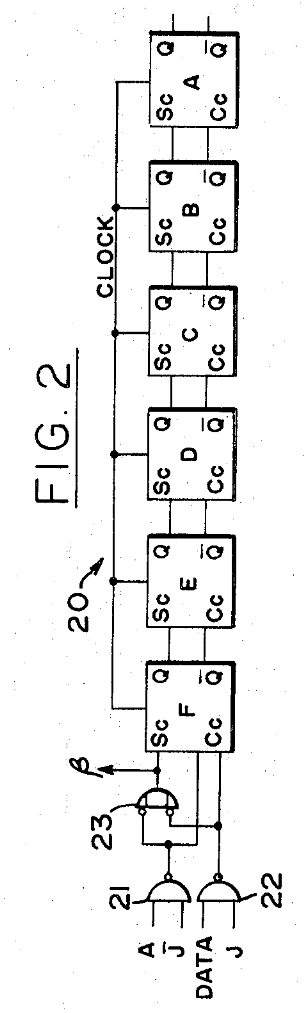

Before proceeding to describe the logic circuitry of the novel encoder of the present invention, reference is first made to the following Table 1 containing a block encoder 32, 6 biorthogonal code dictionary of 64 32-bit code words corresponding to the 64 6-bit data words. This table is presented as one example of an *n*, *m* biorthogonal code wherein *n* = 32 and *m* = 6.

TABLE 1

| Data Word | | | | | | Biorthogonal Code Word | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| f | e | d | c | b | a | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 0 | 0 | 0 | 0 | 1 | 0 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 0 | 0 | 0 | 0 | 1 | 1 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 |
| 0 | 0 | 0 | 1 | 0 | 0 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 0 | 0 | 0 | 1 | 0 | 1 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 |
| 0 | 0 | 0 | 1 | 1 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 |
| 0 | 0 | 0 | 1 | 1 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 |
| 0 | 0 | 1 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 0 | 0 | 1 | 0 | 0 | 1 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 |
| 0 | 0 | 1 | 0 | 1 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 |
| 0 | 0 | 1 | 0 | 1 | 1 | 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 |
| 0 | 0 | 1 | 1 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 |
| 0 | 0 | 1 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 |
| 0 | 0 | 1 | 1 | 1 | 0 | 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 |
| 0 | 0 | 1 | 1 | 1 | 1 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 |
| 0 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 0 | 1 | 0 | 0 | 0 | 1 | 0 | 1 | 0 | 1 | 0 | 1 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 |
| 0 | 1 | 0 | 0 | 1 | 0 | 0 | 0 | 1 | 1 | 0 | 0 | 1 | 1 | 0 | 0 | 1 | 1 | 0 | 0 | 1 | 1 | 1 | 1 | 0 | 0 | 1 | 1 | 0 | 0 | 1 | 1 | 0 | 0 | 1 | 1 | 0 | 0 |
| 0 | 1 | 0 | 0 | 1 | 1 | 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 | 1 | 0 | 0 | 1 | 1 | 0 | 0 | 1 |
| 0 | 1 | 0 | 1 | 0 | 0 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 | 1 | 1 | 1 | 1 | 0 | 0 | 0 | 0 |
| 0 | 1 | 0 | 1 | 0 | 1 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 | 1 | 0 | 1 | 0 | 0 | 1 | 0 | 1 |
| 0 | 1 | 0 | 1 | 1 | 0 | 0 | 0 | 1 | 1 | 1 | 1 | 0 | 0 | 0 | 0 | 1 | 1 | 1 | 1 | 0 | 0 | 1 | 1 | 0 | 0 | 0 | 0 | 1 | 1 | 1 | 1 | 0 | 0 | 0 | 0 | 1 | 1 |
| 0 | 1 | 0 | 1 | 1 | 1 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 | 1 | 0 | 0 | 1 | 0 | 1 | 1 | 0 |
| 0 | 1 | 1 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| 0 | 1 | 1 | 0 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 0 | 1 | 0 | 1 | 0 | 1 | 0 | 1 |
| 0 | 1 | 1 | 0 | 1 | 0 | 0 | 0 | 1 | 1 | 0 | 0 | 1 | 1 | 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 |
| 0 | 1 | 1 | 0 | 1 | 1 | 0 | 1 | 1 | 0 | 0 | 1 | 1 | 0 | 1 | 0 | 0 | 1 | 1 | 0 | 0 | 1 | 1 | 0 | 0 | 1 | 1 | 0 | 0 | 1 | 0 | 1 | 1 | 0 | 0 | 1 | 1 | 0 |
| 0 | 1 | 1 | 1 | 0 | 0 | 0 | 0 | 0 | 0 | 1 | 1 | 1 | 1 | 1 | 1 | 1 | 1 | 0 | 0 | 0 | 0 | 1 | 1 | 1 | 1 | 0 | 0 | 0 | 0 | 0 | 0 | 0 | 0 | 1 | 1 | 1 | 1 |
| 0 | 1 | 1 | 1 | 0 | 1 | 0 | 1 | 0 | 1 | 1 | 0 | 1 | 0 | 1 | 0 | 1 | 0 | 0 | 1 | 0 | 1 | 1 | 0 | 1 | 0 | 0 | 1 | 0 | 1 | 0 | 1 | 0 | 1 | 1 | 0 | 1 | 0 |

TABLE 1—Continued

| Data Word | | | | | | Biorthogonal Code Word | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| f | e | d | c | b | a | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 1 | 1 | 0 | 1 | 0 | 0 | 0 | 1 | 1 | 1 | 1 | 0 | 0 | 1 | 1 | 0 | 0 | 0 | 0 | 1 | 1 | 1 | 1 | 0 | 0 | 0 | 0 | 1 | 1 | 0 | 0 | 1 | 1 | 1 | 1 | 0 | 0 |
| 0 | 1 | 1 | 1 | 1 | 1 | 0 | 1 | 1 | 0 | 1 | 0 | 0 | 1 | 1 | 0 | 0 | 1 | 0 | 1 | 1 | 0 | 1 | 0 | 0 | 1 | 0 | 1 | 1 | 0 | 0 | 1 | 1 | 0 | 1 | 0 | 0 | 1 |
| 1 | 0 | 0 | 0 | 0 | 0 | 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 |
| 1 | 0 | 0 | 0 | 0 | 1 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 | 1 | 1 | 0 | 0 | 0 | 0 | 1 | 1 |
| 1 | 0 | 0 | 0 | 1 | 0 | 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 |
| 1 | 0 | 0 | 0 | 1 | 1 | 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 |
| 1 | 0 | 0 | 1 | 0 | 0 | 1 | 0 | 0 | 1 | 1 | 0 | 0 | 1 | 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 |
| 1 | 0 | 0 | 1 | 0 | 1 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 | 1 | 1 | 0 | 0 | 1 | 1 | 0 | 0 |
| 1 | 0 | 0 | 1 | 1 | 0 | 1 | 0 | 1 | 0 | 1 | 0 | 1 | 0 | 0 | 1 | 0 | 1 | 0 | 1 | 0 | 1 | 0 | 1 | 0 | 1 | 0 | 1 | 0 | 1 | 1 | 0 | 1 | 0 | 1 | 0 | 1 | 0 |
| 1 | 0 | 0 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| 1 | 0 | 1 | 0 | 0 | 0 | 1 | 0 | 0 | 1 | 0 | 1 | 1 | 0 | 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 |
| 1 | 0 | 1 | 0 | 0 | 1 | 1 | 1 | 0 | 0 | 0 | 0 | 1 | 1 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 |
| 1 | 0 | 1 | 0 | 1 | 0 | 1 | 0 | 1 | 0 | 0 | 1 | 0 | 1 | 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 |
| 1 | 0 | 1 | 0 | 1 | 1 | 1 | 1 | 1 | 1 | 0 | 0 | 0 | 0 | 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 |
| 1 | 0 | 1 | 1 | 0 | 0 | 1 | 0 | 0 | 1 | 1 | 0 | 0 | 1 | 1 | 0 | 0 | 1 | 1 | 0 | 0 | 1 | 0 | 1 | 1 | 0 | 0 | 1 | 1 | 0 | 0 | 1 | 1 | 0 | 0 | 1 | 1 | 0 |
| 1 | 0 | 1 | 1 | 0 | 1 | 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 |
| 1 | 0 | 1 | 1 | 1 | 0 | 1 | 0 | 1 | 0 | 1 | 0 | 1 | 0 | 1 | 0 | 1 | 0 | 1 | 0 | 1 | 0 | 0 | 1 | 0 | 1 | 0 | 1 | 0 | 1 | 0 | 1 | 0 | 1 | 0 | 1 | 0 | 1 |
| 1 | 0 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 |
| 1 | 1 | 0 | 0 | 0 | 1 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 |
| 1 | 1 | 0 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 |
| 1 | 1 | 0 | 0 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 |
| 1 | 1 | 0 | 1 | 0 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 |
| 1 | 1 | 0 | 1 | 0 | 1 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 |
| 1 | 1 | 0 | 1 | 1 | 0 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 |
| 1 | 1 | 0 | 1 | 1 | 1 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| 1 | 1 | 1 | 0 | 0 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 |
| 1 | 1 | 1 | 0 | 0 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 |
| 1 | 1 | 1 | 0 | 1 | 0 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 |
| 1 | 1 | 1 | 0 | 1 | 1 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 |
| 1 | 1 | 1 | 1 | 0 | 0 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 |
| 1 | 1 | 1 | 1 | 0 | 1 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 |
| 1 | 1 | 1 | 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

The letters *a* through *f* are used to designate the six bits of each data word and numerals O through 31 designate the 32 code bits of each code word. An analysis of the dictionary indicates that a definite algorithm can be used to obtain the bits of each code word from the six bits of the data word with which it (the code word) is associated. Using the designations *a* through *f* and O through 31 it may be shown that, $0=a\oplus b\oplus c\oplus d\oplus e$ $1=b\oplus c\oplus d\oplus e\oplus f$ $2=a\oplus c\oplus d\oplus e\oplus f$ $3=c\oplus d\oplus e$ $4=a\oplus b\oplus d\oplus e\oplus f$

,

, $16=a\oplus b\oplus c\oplus d\oplus f$

,

, $30=a$ $31=f$

That is, the code bit O is binary 1 only if the modulo-2 sum of bits *a*, *b*, *c*, *d* and *e* of the data word is a binary 1. The conventional sign ⊕ represents modulo- 2 addition. Likewise, the code bit 1 is a binary 1 only if the modulo-2 sum of data bits *b*, *c*, *d*, *e* and *f* is a binary 1.

The complete pattern is shown in the following table 2 in which the x's represent the bits *a* through *f* of the data word which are included in forming the modulo-2 summing logic operation.

TABLE 2

| Biorthogonal code bit number | Modulo 2 sum of— f | e | d | c | b | a |
|---|---|---|---|---|---|---|
| 00000= 0 | | x | x | x | x | x |
| 00001= 1 | x | x | x | x | x | |
| 00010= 2 | x | x | x | x | | x |
| 00011= 3 | | x | x | x | | |
| 00100= 4 | x | x | x | | x | x |
| 00101= 5 | | x | x | | x | |
| 00110= 6 | | x | x | | | x |
| 00111= 7 | x | x | x | | | |
| 01000= 8 | x | x | | x | x | x |
| 01001= 9 | | x | | x | x | |
| 01010=10 | | x | | x | | x |
| 01011=11 | x | x | | x | | |
| 01100=12 | | x | | | x | x |
| 01101=13 | x | x | | | x | |
| 01110=14 | x | x | | | | x |
| 01111=15 | | x | | | | |
| 10000=16 | x | | x | x | x | x |
| 10001=17 | | | x | x | x | |

*TABLE 2—Continued*

| Biorthogonal code bit number | Modulo 2 sum of— *f* | *e* | *d* | *c* | *b* | *a* |
|---|---|---|---|---|---|---|
| 10010=18 | | | x | x | | x |
| 10011=19 | x | | x | x | | |
| 10100=20 | | | x | | x | x |
| 10101=21 | x | | x | | x | |
| 10110=22 | x | | x | | | x |
| 10111=23 | | | x | | | |
| 11000=24 | | | | x | x | x |
| 11001=25 | x | | | x | x | |
| 11010=26 | x | | | x | | x |
| 11011=27 | | | | x | | |
| 11100=28 | x | | | | x | x |
| 11101=29 | | | | | x | |
| 11110=30 | | | | | | x |
| 11111=31 | x | | | | | |

From Table 2 it can be seen that the *a* data bit enters into the modulo-2 sum of all even numbered code bits (0, 2, 4 etc.) and in none of the odd numbered code bits (1, 3 etc.). Likewise, data bit *b* enters into the mod-2 sum of the first two (such as O and 1 or 4 and 5) of each group of four code bits (such as O through 3 or 4 through 7), data bit *c* for the first four (O through 3) of each group of eight code bits (such as O through 7), data bit *d* for the first eight (O through 7 or 16 through 23) for each group of sixteen (O through 15 or 16 through 31), while data bit *e* for the first 16 (O through 15) of the 32 code bits. The algorithm for data bit *f* may be seen to be dependent on the number of binary zeros in the binary form of the code bit number. Data bit *f* enters the modulo-2 sum of each code bit which in binary form has an even number of zeros (0's ). Thus, for example, it enters the modulo-2 sum for code bits 1, 2 and 4, since these code bit numbers have binary forms 00001, 00010 and 00100, each one of which has an even number of O's.

The principles of this algorithm may be applied to provide other *n*, *m* biorthogonal codes in which *n* and *m* assume values other than 32 and 6 respectively. For example, a 64, 7 biorthogonal code can be produced with the same algorithm. In such a case, the first five bits (starting with the least significant) of the data word will enter into the mod-2 summation as herebefore described. The sixth bit (or second most significant bit) will enter the mod-2 summation of the first 32 (0—31) of the 64 code bits, while the seventh or most significant bit will enter the mod-2 summation as a function of the number of 0's in the code bit number binary form, in a manner similar to bit *f*, herebefore described.

In accordance with the teachings of the present invention, the algorithm or pattern shown in Table 2 is implemented by storing the input data word in a data shift register and by containing the code bit number, in binary representation, in a shift register binary counter, hereafter also referred to as the code bit number shift register. The contents of the two registers are cycled around once every code bit period, in a way which will be described hereafter in detail, so that at the end of each period, the binary or logic output of one set of modulo-2 adders, which is associated with the two registers, represents one of the code bits, of a code word of the biorthogonal code. This code bit is modulo-2 added to a bit of a fixed 32-bit comma free vector code to produce the desired code bit of a code word of the comma free biorthogonal code.

Figure 1:
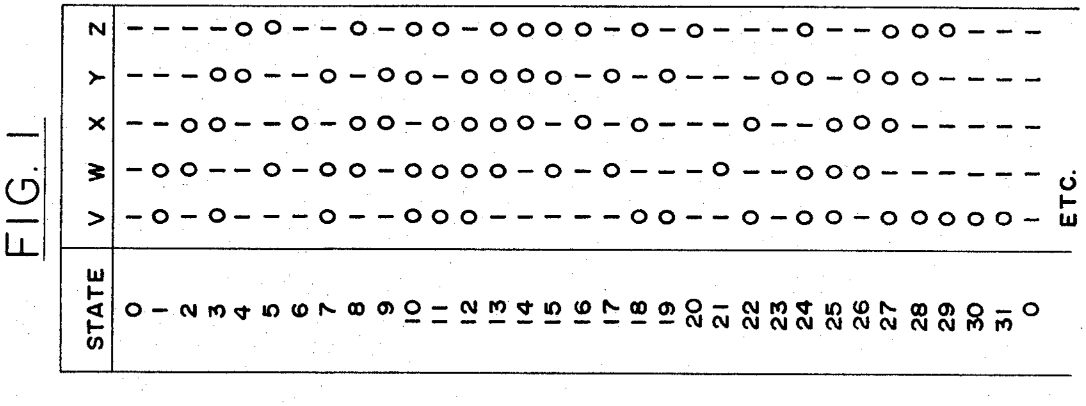
FIG. 1 is a table of the binary states of stages of a comma free vector code generator, during 32 successive states.

The comma free vector code is generated by a 5-bit shift register with modulo-2 feedback logic, one example of which will be described hereafter in detail. The example of a comma free vector code which may be generated is shown in FIG. 1 in which the 1's and 0's under the columns headed by V, W, X, Y and Z represent the binary states of flip-flops V, W, X, Y and Z of a 5-bit vector code shift register, during code bit periods O through 31 when code bits O through 31 of the desired code word are generated. The code bit in the comma free biorthogonal code is obtained by modulo-2 summing the Z bit with the code bit of the biorthogonal code. The complete dictionary of the comma free biorthogonal code is included in the following Table 3.

Reference is now made to FIGS. 2 through 6, which represent block diagrams of different portions of the encoder circuitry of the present invention. FIG. 2 is a block diagram of a six-stage shift register 20 consisting of flip-flops A, B, C, D, E and F, and three control input gates 21, 22 and 23. The gates control the entering of a new input data word designated DATA into the register during a last of 32 code bit periods, (when a flip-flop J, to be described hereafter in conjunction with FIG. 6, is a binary one) during which the first code bit is produced. The gates also control the cycling of the register content during the other code bit periods, i.e., when J is a binary zero.

Figure 3:
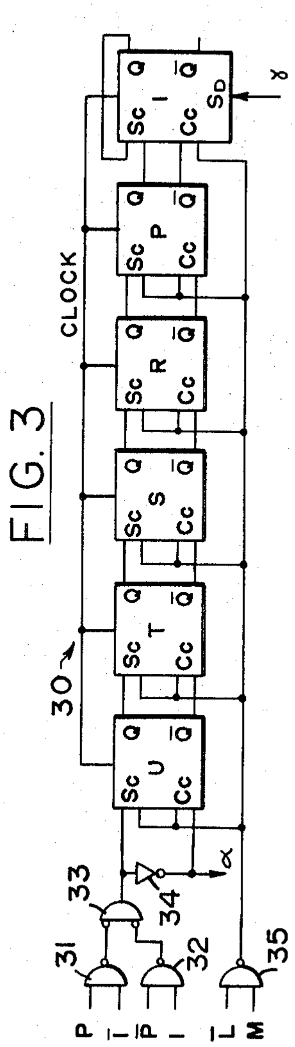

FIG. 3 is a block diagram of code bit number shift register 30 in which the code bit number, in binary representation, is stored in flip-flops P, R, S, T and U at the start of each code bit period. Flip-flop I indicates whether bits should be inverted as they are shifted around the end of the register 30, while gates 31, 32 and 33 are inverter 34 invert or do not invert bits (inputs to flip-flop U) as indicated by flip-flop I. Gate 35 is used to inhibit the shifting of the content in the register during the transition between the fifth and sixth of six intervals or clock periods, which define each code bit period.

Figure 4:
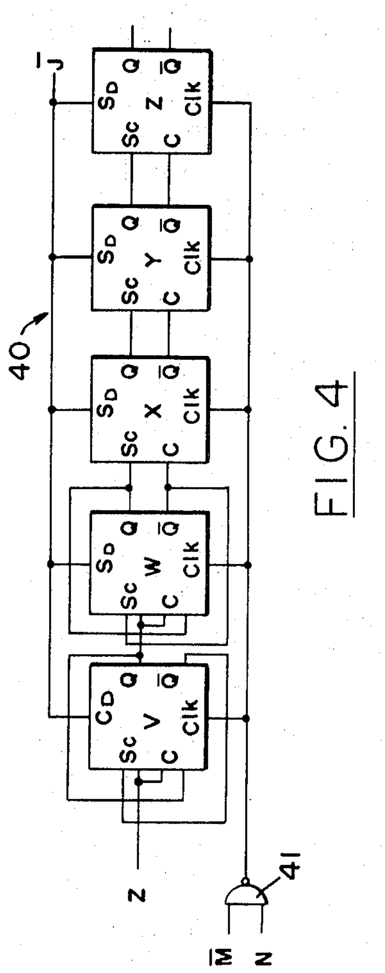

FIG. 4 is a block diagram of a comma free vector code shift register 40, comprising five flip-flops V, W, X, Y and Z wherein the input to flip-flop V is a function of the modulo-2 sum of its output and the output of Z, while the input to W is function of the modulo-2 sum of its own output and that of V.

TABLE 3

| Data Word | | | | | | Comma-Free Biorthogonal Code Word | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| f | e | d | c | b | a | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 1 | 0 | 0 | 0 | 1 | 1 | 0 | 1 | 1 | 1 | 0 | 1 | 0 | 1 | 0 | 0 | 0 | 0 | 1 | 0 | 0 | 1 | 0 | 1 | 1 | 0 | 0 | 1 | 1 | 1 | 1 | 1 |
| 0 | 0 | 0 | 0 | 0 | 1 | 1 | 1 | 0 | 1 | 1 | 0 | 0 | 0 | 1 | 0 | 0 | 0 | 0 | 0 | 0 | 1 | 0 | 1 | 1 | 1 | 0 | 0 | 0 | 0 | 1 | 1 | 0 | 0 | 1 | 0 | 1 | 0 |
| 0 | 0 | 0 | 0 | 1 | 0 | 1 | 0 | 1 | 1 | 1 | 1 | 1 | 0 | 1 | 1 | 1 | 0 | 0 | 1 | 1 | 1 | 0 | 0 | 0 | 1 | 0 | 1 | 1 | 0 | 1 | 0 | 1 | 0 | 1 | 1 | 0 | 0 |
| 0 | 0 | 0 | 0 | 1 | 1 | 1 | 1 | 1 | 0 | 1 | 0 | 1 | 1 | 1 | 0 | 1 | 1 | 0 | 0 | 1 | 0 | 0 | 1 | 0 | 0 | 0 | 0 | 1 | 1 | 1 | 1 | 1 | 1 | 1 | 0 | 0 | 1 |
| 0 | 0 | 0 | 1 | 0 | 0 | 1 | 0 | 0 | 0 | 0 | 0 | 1 | 0 | 1 | 1 | 0 | 1 | 1 | 0 | 1 | 1 | 0 | 0 | 1 | 0 | 1 | 0 | 1 | 0 | 1 | 0 | 0 | 1 | 0 | 0 | 0 | 0 |
| 0 | 0 | 0 | 1 | 0 | 1 | 1 | 1 | 0 | 1 | 0 | 1 | 1 | 1 | 1 | 0 | 0 | 0 | 1 | 1 | 1 | 0 | 0 | 1 | 1 | 1 | 1 | 1 | 1 | 1 | 1 | 1 | 0 | 0 | 0 | 1 | 0 | 1 |
| 0 | 0 | 0 | 1 | 1 | 0 | 1 | 0 | 1 | 1 | 0 | 0 | 0 | 1 | 1 | 1 | 1 | 0 | 1 | 0 | 0 | 0 | 0 | 0 | 0 | 1 | 1 | 0 | 0 | 1 | 1 | 0 | 1 | 0 | 0 | 0 | 1 | 1 |
| 0 | 0 | 0 | 1 | 1 | 1 | 1 | 1 | 1 | 0 | 0 | 1 | 0 | 0 | 1 | 0 | 1 | 1 | 1 | 1 | 0 | 1 | 0 | 1 | 0 | 0 | 1 | 1 | 0 | 0 | 1 | 1 | 1 | 1 | 0 | 1 | 1 | 0 |
| 0 | 0 | 1 | 0 | 0 | 0 | 1 | 0 | 0 | 0 | 1 | 1 | 0 | 1 | 0 | 0 | 1 | 0 | 1 | 0 | 1 | 1 | 0 | 0 | 1 | 0 | 0 | 1 | 0 | 1 | 0 | 1 | 1 | 0 | 0 | 0 | 0 | 0 |
| 0 | 0 | 1 | 0 | 0 | 1 | 1 | 1 | 0 | 1 | 1 | 0 | 0 | 0 | 0 | 1 | 1 | 1 | 1 | 1 | 1 | 0 | 0 | 1 | 1 | 1 | 0 | 0 | 0 | 0 | 0 | 0 | 1 | 1 | 0 | 1 | 0 | 1 |
| 0 | 0 | 1 | 0 | 1 | 0 | 1 | 0 | 1 | 1 | 1 | 1 | 1 | 0 | 0 | 0 | 0 | 1 | 1 | 0 | 0 | 0 | 0 | 0 | 0 | 1 | 0 | 1 | 1 | 0 | 0 | 1 | 0 | 1 | 0 | 0 | 1 | 1 |
| 0 | 0 | 1 | 0 | 1 | 1 | 1 | 1 | 1 | 0 | 1 | 0 | 1 | 1 | 0 | 1 | 0 | 0 | 1 | 1 | 0 | 1 | 0 | 1 | 0 | 0 | 0 | 0 | 1 | 1 | 0 | 0 | 0 | 0 | 0 | 1 | 1 | 0 |
| 0 | 0 | 1 | 1 | 0 | 0 | 1 | 0 | 0 | 0 | 0 | 0 | 1 | 0 | 0 | 0 | 1 | 0 | 0 | 1 | 0 | 0 | 0 | 0 | 1 | 0 | 1 | 0 | 1 | 0 | 0 | 1 | 1 | 0 | 1 | 1 | 1 | 1 |
| 0 | 0 | 1 | 1 | 0 | 1 | 1 | 1 | 0 | 1 | 0 | 1 | 1 | 1 | 0 | 1 | 1 | 1 | 0 | 0 | 0 | 1 | 0 | 1 | 1 | 1 | 1 | 1 | 1 | 1 | 0 | 0 | 1 | 1 | 1 | 0 | 1 | 0 |
| 0 | 0 | 1 | 1 | 1 | 0 | 1 | 0 | 1 | 1 | 0 | 0 | 0 | 1 | 0 | 0 | 0 | 1 | 0 | 1 | 1 | 1 | 0 | 0 | 0 | 1 | 1 | 0 | 0 | 1 | 0 | 1 | 0 | 1 | 1 | 1 | 0 | 0 |
| 0 | 0 | 1 | 1 | 1 | 1 | 1 | 1 | 1 | 0 | 0 | 1 | 0 | 0 | 0 | 1 | 0 | 0 | 0 | 0 | 1 | 0 | 0 | 1 | 0 | 0 | 1 | 1 | 0 | 0 | 0 | 0 | 0 | 0 | 1 | 0 | 0 | 1 |
| 0 | 1 | 0 | 0 | 0 | 0 | 1 | 0 | 0 | 0 | 1 | 1 | 0 | 1 | 1 | 1 | 0 | 1 | 0 | 1 | 0 | 0 | 1 | 1 | 0 | 1 | 1 | 0 | 1 | 0 | 0 | 1 | 1 | 0 | 0 | 0 | 0 | 0 |
| 0 | 1 | 0 | 0 | 0 | 1 | 1 | 1 | 0 | 1 | 1 | 0 | 0 | 0 | 1 | 0 | 0 | 0 | 0 | 0 | 0 | 1 | 1 | 0 | 0 | 0 | 1 | 1 | 1 | 1 | 0 | 0 | 1 | 1 | 0 | 1 | 0 | 1 |
| 0 | 1 | 0 | 0 | 1 | 0 | 1 | 0 | 1 | 1 | 1 | 1 | 1 | 0 | 1 | 1 | 1 | 0 | 0 | 1 | 1 | 1 | 1 | 1 | 1 | 0 | 1 | 0 | 0 | 1 | 0 | 1 | 0 | 1 | 0 | 0 | 1 | 1 |
| 0 | 1 | 0 | 0 | 1 | 1 | 1 | 1 | 1 | 0 | 1 | 0 | 1 | 1 | 1 | 0 | 1 | 1 | 0 | 0 | 1 | 0 | 1 | 0 | 1 | 1 | 1 | 1 | 0 | 0 | 0 | 0 | 0 | 0 | 0 | 1 | 1 | 0 |
| 0 | 1 | 0 | 1 | 0 | 0 | 1 | 0 | 0 | 0 | 0 | 0 | 1 | 0 | 1 | 1 | 0 | 1 | 1 | 0 | 1 | 1 | 1 | 1 | 0 | 1 | 0 | 1 | 0 | 1 | 0 | 1 | 1 | 0 | 1 | 1 | 1 | 1 |
| 0 | 1 | 0 | 1 | 0 | 1 | 1 | 1 | 0 | 1 | 0 | 1 | 1 | 1 | 1 | 0 | 0 | 0 | 1 | 1 | 1 | 0 | 1 | 0 | 0 | 0 | 0 | 0 | 0 | 0 | 0 | 0 | 1 | 1 | 1 | 0 | 1 | 0 |
| 0 | 1 | 0 | 1 | 1 | 0 | 1 | 0 | 1 | 1 | 0 | 0 | 0 | 1 | 1 | 1 | 1 | 0 | 1 | 0 | 0 | 0 | 1 | 1 | 1 | 0 | 0 | 1 | 1 | 0 | 0 | 1 | 0 | 1 | 1 | 1 | 0 | 0 |
| 0 | 1 | 0 | 1 | 1 | 1 | 1 | 1 | 1 | 0 | 0 | 1 | 0 | 0 | 1 | 0 | 1 | 1 | 1 | 1 | 0 | 1 | 1 | 0 | 1 | 1 | 0 | 0 | 1 | 1 | 0 | 0 | 0 | 0 | 1 | 0 | 0 | 1 |
| 0 | 1 | 1 | 0 | 0 | 0 | 1 | 0 | 0 | 0 | 1 | 1 | 0 | 1 | 0 | 0 | 1 | 0 | 1 | 0 | 1 | 1 | 1 | 1 | 0 | 1 | 1 | 0 | 1 | 0 | 1 | 0 | 0 | 1 | 1 | 1 | 1 | 1 |
| 0 | 1 | 1 | 0 | 0 | 1 | 1 | 1 | 0 | 1 | 1 | 0 | 0 | 0 | 0 | 1 | 1 | 1 | 1 | 1 | 1 | 0 | 1 | 0 | 0 | 0 | 1 | 1 | 1 | 1 | 1 | 1 | 0 | 0 | 1 | 0 | 1 | 0 |
| 0 | 1 | 1 | 0 | 1 | 0 | 1 | 0 | 1 | 1 | 1 | 1 | 1 | 0 | 0 | 0 | 0 | 1 | 1 | 0 | 0 | 0 | 1 | 1 | 1 | 0 | 1 | 0 | 0 | 1 | 1 | 0 | 1 | 0 | 1 | 1 | 0 | 0 |
| 0 | 1 | 1 | 0 | 1 | 1 | 1 | 1 | 1 | 0 | 1 | 0 | 1 | 1 | 0 | 1 | 0 | 0 | 1 | 1 | 0 | 1 | 1 | 0 | 1 | 1 | 1 | 1 | 0 | 0 | 1 | 1 | 1 | 1 | 1 | 0 | 0 | 1 |
| 0 | 1 | 1 | 1 | 0 | 0 | 1 | 0 | 0 | 0 | 0 | 0 | 1 | 0 | 0 | 0 | 1 | 0 | 0 | 1 | 0 | 0 | 1 | 1 | 0 | 1 | 0 | 1 | 0 | 1 | 1 | 0 | 0 | 1 | 0 | 0 | 0 | 0 |
| 0 | 1 | 1 | 1 | 0 | 1 | 1 | 1 | 0 | 1 | 0 | 1 | 1 | 1 | 0 | 1 | 1 | 1 | 0 | 0 | 0 | 1 | 1 | 0 | 0 | 0 | 0 | 0 | 0 | 0 | 1 | 1 | 0 | 0 | 0 | 1 | 0 | 1 |
| 0 | 1 | 1 | 1 | 1 | 0 | 1 | 0 | 1 | 1 | 0 | 0 | 0 | 1 | 0 | 0 | 0 | 1 | 0 | 1 | 1 | 1 | 1 | 1 | 1 | 0 | 0 | 1 | 1 | 0 | 1 | 0 | 1 | 0 | 0 | 0 | 1 | 1 |
| 0 | 1 | 1 | 1 | 1 | 1 | 1 | 1 | 1 | 0 | 0 | 1 | 0 | 0 | 0 | 1 | 0 | 0 | 0 | 0 | 1 | 0 | 1 | 0 | 1 | 1 | 0 | 0 | 1 | 1 | 1 | 1 | 1 | 1 | 0 | 1 | 1 | 0 |
| 1 | 0 | 0 | 0 | 0 | 0 | 0 | 0 | 0 | 1 | 1 | 0 | 1 | 1 | 1 | 0 | 1 | 1 | 1 | 1 | 0 | 1 | 0 | 1 | 0 | 0 | 1 | 1 | 0 | 0 | 0 | 0 | 0 | 0 | 1 | 0 | 0 | 1 |
| 1 | 0 | 0 | 0 | 0 | 1 | 0 | 1 | 0 | 0 | 1 | 1 | 1 | 0 | 1 | 1 | 1 | 0 | 1 | 0 | 0 | 0 | 0 | 0 | 0 | 1 | 1 | 0 | 0 | 1 | 0 | 1 | 0 | 1 | 1 | 1 | 0 | 0 |
| 1 | 0 | 0 | 0 | 1 | 0 | 0 | 0 | 1 | 0 | 1 | 0 | 0 | 0 | 1 | 0 | 0 | 0 | 1 | 1 | 1 | 0 | 0 | 1 | 1 | 1 | 1 | 1 | 1 | 1 | 0 | 0 | 1 | 1 | 1 | 0 | 1 | 0 |
| 1 | 0 | 0 | 0 | 1 | 1 | 0 | 1 | 1 | 1 | 1 | 1 | 0 | 1 | 1 | 1 | 0 | 1 | 1 | 0 | 1 | 1 | 0 | 0 | 1 | 0 | 1 | 0 | 1 | 0 | 0 | 1 | 1 | 0 | 1 | 1 | 1 | 1 |
| 1 | 0 | 0 | 1 | 0 | 0 | 0 | 0 | 0 | 1 | 0 | 1 | 0 | 0 | 1 | 0 | 1 | 1 | 0 | 0 | 1 | 0 | 0 | 1 | 1 | 0 | 0 | 0 | 1 | 1 | 0 | 0 | 0 | 0 | 0 | 1 | 1 | 0 |
| 1 | 0 | 0 | 1 | 0 | 1 | 0 | 1 | 0 | 0 | 0 | 0 | 0 | 1 | 1 | 1 | 1 | 0 | 0 | 1 | 1 | 1 | 0 | 0 | 0 | 1 | 0 | 1 | 1 | 0 | 0 | 1 | 0 | 1 | 0 | 0 | 1 | 1 |
| 1 | 0 | 0 | 1 | 1 | 0 | 0 | 0 | 1 | 0 | 0 | 1 | 1 | 1 | 1 | 0 | 0 | 0 | 0 | 0 | 0 | 1 | 0 | 1 | 1 | 1 | 0 | 0 | 0 | 0 | 0 | 0 | 1 | 1 | 0 | 1 | 0 | 1 |
| 1 | 0 | 0 | 1 | 1 | 1 | 0 | 1 | 1 | 1 | 0 | 0 | 1 | 0 | 1 | 1 | 0 | 1 | 0 | 1 | 0 | 0 | 0 | 0 | 1 | 0 | 0 | 1 | 0 | 1 | 0 | 1 | 1 | 0 | 0 | 0 | 0 | 0 |
| 1 | 0 | 1 | 0 | 0 | 0 | 0 | 0 | 0 | 1 | 1 | 0 | 1 | 1 | 0 | 1 | 0 | 0 | 0 | 1 | 0 | 0 | 0 | 1 | 0 | 0 | 1 | 1 | 0 | 0 | 1 | 1 | 1 | 1 | 0 | 1 | 1 | 0 |
| 1 | 0 | 1 | 0 | 0 | 1 | 0 | 1 | 0 | 0 | 1 | 1 | 1 | 0 | 0 | 0 | 0 | 1 | 0 | 1 | 1 | 1 | 0 | 0 | 0 | 1 | 1 | 0 | 0 | 1 | 1 | 0 | 1 | 0 | 0 | 0 | 1 | 1 |
| 1 | 0 | 1 | 0 | 1 | 0 | 0 | 0 | 1 | 0 | 1 | 0 | 0 | 0 | 0 | 1 | 1 | 1 | 0 | 0 | 0 | 1 | 0 | 1 | 1 | 1 | 1 | 1 | 1 | 1 | 1 | 1 | 0 | 0 | 0 | 1 | 0 | 1 |
| 1 | 0 | 1 | 0 | 1 | 1 | 0 | 1 | 1 | 1 | 1 | 1 | 0 | 1 | 0 | 0 | 1 | 0 | 0 | 1 | 0 | 0 | 0 | 0 | 1 | 0 | 1 | 0 | 1 | 0 | 1 | 0 | 0 | 1 | 0 | 0 | 0 | 0 |
| 1 | 0 | 1 | 1 | 0 | 0 | 0 | 0 | 0 | 1 | 0 | 1 | 0 | 0 | 0 | 1 | 0 | 0 | 1 | 1 | 0 | 1 | 0 | 1 | 0 | 0 | 0 | 0 | 1 | 1 | 1 | 1 | 1 | 1 | 1 | 0 | 0 | 1 |
| 1 | 0 | 1 | 1 | 0 | 1 | 0 | 1 | 0 | 0 | 0 | 0 | 0 | 1 | 0 | 0 | 0 | 1 | 1 | 0 | 0 | 0 | 0 | 0 | 0 | 1 | 0 | 1 | 1 | 0 | 1 | 0 | 1 | 0 | 1 | 1 | 0 | 0 |
| 1 | 0 | 1 | 1 | 1 | 0 | 0 | 0 | 1 | 0 | 0 | 1 | 1 | 1 | 0 | 1 | 1 | 1 | 1 | 1 | 1 | 0 | 0 | 1 | 1 | 1 | 0 | 0 | 0 | 0 | 1 | 1 | 0 | 0 | 1 | 0 | 1 | 0 |
| 1 | 0 | 1 | 1 | 1 | 1 | 0 | 1 | 1 | 1 | 0 | 0 | 1 | 0 | 0 | 0 | 1 | 0 | 1 | 0 | 1 | 1 | 0 | 0 | 1 | 0 | 0 | 1 | 0 | 1 | 1 | 0 | 0 | 1 | 1 | 1 | 1 | 1 |
| 1 | 1 | 0 | 0 | 0 | 0 | 0 | 0 | 0 | 1 | 1 | 0 | 1 | 1 | 1 | 0 | 1 | 1 | 1 | 1 | 0 | 1 | 1 | 0 | 1 | 1 | 0 | 0 | 1 | 1 | 1 | 1 | 1 | 1 | 0 | 1 | 1 | 0 |
| 1 | 1 | 0 | 0 | 0 | 1 | 0 | 1 | 0 | 0 | 1 | 1 | 1 | 0 | 1 | 1 | 1 | 0 | 1 | 0 | 0 | 0 | 1 | 1 | 1 | 0 | 0 | 1 | 1 | 0 | 1 | 0 | 1 | 0 | 0 | 0 | 1 | 1 |
| 1 | 1 | 0 | 0 | 1 | 0 | 0 | 0 | 1 | 0 | 1 | 0 | 0 | 0 | 1 | 0 | 0 | 0 | 1 | 1 | 1 | 0 | 1 | 0 | 0 | 0 | 0 | 0 | 0 | 0 | 1 | 1 | 0 | 0 | 0 | 1 | 0 | 1 |
| 1 | 1 | 0 | 0 | 1 | 1 | 0 | 1 | 1 | 1 | 1 | 1 | 0 | 1 | 1 | 1 | 0 | 1 | 1 | 0 | 1 | 1 | 1 | 1 | 0 | 1 | 0 | 1 | 0 | 1 | 0 | 0 | 0 | 1 | 0 | 0 | 0 | 0 |
| 1 | 1 | 0 | 1 | 0 | 0 | 0 | 0 | 0 | 1 | 0 | 1 | 0 | 0 | 1 | 0 | 1 | 1 | 0 | 0 | 1 | 0 | 1 | 0 | 1 | 1 | 1 | 1 | 0 | 0 | 1 | 1 | 1 | 1 | 1 | 0 | 0 | 1 |
| 1 | 1 | 0 | 1 | 0 | 1 | 0 | 1 | 0 | 0 | 0 | 0 | 0 | 1 | 1 | 1 | 1 | 0 | 0 | 1 | 1 | 1 | 1 | 1 | 1 | 0 | 1 | 0 | 0 | 1 | 1 | 0 | 1 | 0 | 1 | 1 | 0 | 0 |
| 1 | 1 | 0 | 1 | 1 | 0 | 0 | 0 | 1 | 0 | 0 | 1 | 1 | 1 | 1 | 0 | 0 | 0 | 0 | 0 | 0 | 1 | 1 | 0 | 0 | 0 | 1 | 1 | 1 | 1 | 1 | 1 | 0 | 0 | 1 | 0 | 1 | 0 |
| 1 | 1 | 0 | 1 | 1 | 1 | 0 | 1 | 1 | 1 | 0 | 0 | 1 | 0 | 1 | 1 | 0 | 1 | 0 | 1 | 0 | 0 | 1 | 1 | 0 | 1 | 1 | 0 | 1 | 0 | 1 | 0 | 0 | 1 | 1 | 1 | 1 | 1 |
| 1 | 1 | 1 | 0 | 0 | 0 | 0 | 0 | 0 | 1 | 1 | 0 | 1 | 1 | 0 | 1 | 0 | 0 | 0 | 0 | 1 | 0 | 1 | 0 | 1 | 1 | 0 | 0 | 1 | 1 | 0 | 0 | 0 | 0 | 1 | 0 | 0 | 1 |
| 1 | 1 | 1 | 0 | 0 | 1 | 0 | 1 | 0 | 0 | 1 | 1 | 1 | 0 | 0 | 0 | 0 | 1 | 0 | 1 | 1 | 1 | 1 | 1 | 1 | 0 | 0 | 1 | 1 | 0 | 0 | 1 | 0 | 1 | 1 | 1 | 0 | 0 |
| 1 | 1 | 1 | 0 | 1 | 0 | 0 | 0 | 1 | 0 | 1 | 0 | 0 | 0 | 0 | 1 | 1 | 1 | 0 | 0 | 0 | 1 | 1 | 0 | 0 | 0 | 0 | 0 | 0 | 0 | 0 | 0 | 1 | 1 | 1 | 0 | 1 | 0 |
| 1 | 1 | 1 | 0 | 1 | 1 | 0 | 1 | 1 | 1 | 1 | 1 | 0 | 1 | 0 | 0 | 1 | 0 | 0 | 1 | 0 | 0 | 1 | 1 | 0 | 1 | 0 | 1 | 0 | 1 | 0 | 1 | 1 | 0 | 1 | 1 | 1 | 1 |
| 1 | 1 | 1 | 1 | 0 | 0 | 0 | 0 | 0 | 1 | 0 | 1 | 0 | 0 | 0 | 1 | 0 | 0 | 1 | 1 | 0 | 1 | 1 | 0 | 1 | 1 | 1 | 1 | 0 | 0 | 0 | 0 | 0 | 0 | 0 | 1 | 1 | 0 |
| 1 | 1 | 1 | 1 | 0 | 1 | 0 | 1 | 0 | 0 | 0 | 0 | 0 | 1 | 0 | 0 | 0 | 1 | 1 | 0 | 0 | 0 | 1 | 1 | 1 | 0 | 1 | 0 | 0 | 1 | 0 | 1 | 0 | 1 | 0 | 0 | 1 | 1 |
| 1 | 1 | 1 | 1 | 1 | 0 | 0 | 0 | 1 | 0 | 0 | 1 | 1 | 1 | 0 | 1 | 1 | 1 | 1 | 1 | 1 | 0 | 1 | 0 | 0 | 0 | 1 | 1 | 1 | 1 | 0 | 0 | 1 | 1 | 0 | 1 | 0 | 1 |
| 1 | 1 | 1 | 1 | 1 | 1 | 0 | 1 | 1 | 1 | 0 | 0 | 1 | 0 | 0 | 0 | 1 | 0 | 1 | 0 | 1 | 1 | 1 | 1 | 0 | 1 | 1 | 0 | 1 | 0 | 0 | 1 | 1 | 0 | 0 | 0 | 0 | 0 |

The output of a gate 41 is used to shift the content of the register's flip-flops during a specific clock period of the six periods of each code bit period.

FIG. 5 is a simple shift register 50 consisting of three flip-flops L, M and N, which are clocked by clock pulses from a clock 52. The function of register 50 is to divide each code bit period into six clock periods, represented by six unique combinations of the states of flip-flops L, M and N. These are shown in the left-hand column of FIG. 7 to which reference is made herein.

The clock 52 which is shown in FIG. 5, is not intended to be part of the encoder disclosed herein. However, it is diagrammed in order to show the three outputs thereof required to control the registers or gates shown in FIGS. 2 through 6. Basically, the clock 52 has one output, designated CLOCK, at which are provided clock pulses which are used to clock the stages of register 20 (see FIG. 2), register 30 (see FIG. 3), register 50 (see FIG. 5) and flip-flops I and K. The clock also has outputs designated CLOCK⊕ 2/4 and CLOCK⊕ 2/4 and ⊕ 3/4. The clock⊕ 2/4 designation indicates that the output line is high or active during the second quarter of the clock period, while the clock⊕ 2/4 and ⊕ 3/4 designation means that the output line is high without slippage or "glitch" during the second and third quarters of the clock period. These outputs may be conveniently obtained by employing a conventional clock whose output is divided by four by a two-stage divide-by-four Johnson-type counter used in external shared count-down chain.

FIG. 6 is a block diagram of four separate flip-flops K, G, H and J, flip-flop G being associated with three input control gates 61, 62 and 63. Gate 62 is in turn controlled by the output of a clock-period-defining gate 64 whose output, after being inverted by inverter 65, controls gate 61. Briefly, at the end of each code bit period, the Q or true output of G is a logic 1 whenever the derived biorthogonal code bit is to be a 1.

Flip-flop H associated with three input control gates 66, 67 and 68 performs, at the end of each code bit period, the modulo-2 addition of the biorthogonal code bit represented by the output of G and the comma free vector code bit represented by the output of flip-flop Z (see FIG. 4). Flip-flop K is used to sense the number of binary zeros (0's) in the code bit number, in binary representation, which is necessary to determine whether the *f* data bit is to be included in the modulo-2 summation for the biorthogonal code bit. Flip-flop J is used to provide a true output during the last code bit period during which a new data word may be clocked into register 20, one bit per clock period, as well as to reset register 40 (see FIG. 4) to its initial state of 01111 (in binary form).

Before proceeding to describe the operation of the logic circuitry, shown in FIGS. 2 through 6, reference is first made to the following lead designations which are used for the flip-flops: $S_c$ = clocked set (active = high), $C_c$ = clocked clear (reset), where the $S_c$ or $C_c$ inputs of any flip-flop are logically combined in an AND gate (not shown) in the flip-flop, $S_D$ = direct (asynchronous) set (active = low), $C_D$ = direct clear, Clk = clock pulse (negative transition), Q = "true" output which is assumed to be a logic 1 when the flip-flop is set and $\overline{Q}$ = "false" output. Input leads to the encoder are DATA, representing a data word, serially supplied bit by bit, and the three outputs of clock 52, herebefore explained. A flip-flop letter designation such as N represents a connection to the Q terminal of flip-flop N while a letter designation with bar above it such as $\overline{N}$ represents a connection to N's $\overline{Q}$ terminal. The encoder output is designated CODE representing the Q output of flip-flop H. $\overline{CODE}$ is the complementary encoder output.

The particular lead designations are for specific circuits which were actually used in reducing the invention to practice. The circuits used included low power diode transistor micrologic (LPDTML) integrated circuits of the type manufactured and sold by Fairchild Semiconductor of Mountainview, Cal. These circuits are extensively described in copyrighted publications of Fairchild Semiconductor. It should be pointed out that the particular circuits are presented only as an example of one embodiment of the invention. It should be clear that other like circuits may be employed to practice the teachings disclosed herein.

As stated previously, the function of flip-flops L, M and N of register 50 of register 50 (FIG. 5) is to define, by the binary states of L, M and N six discrete clock periods which together define one code bit period. The six clock periods are shown, in terms of the states of flip-flops L, M and N, in the left-hand column of FIG. 7. During the first clock period when *L*, *M* and *N* are all 0's, the least significant bit (LSB) of the data word, is in the A flip-flop of data word register 20 (see FIG. 2) while the next least significant bit is in flip-flop B, etc., so that the most significant bit (MSB) is in flip-flop F. During the same clock period, namely, the first of the six clock periods, flip-flop U of the code bit number shift register 30 (see FIG. 3) contains the most significant bit of the code bit number in binary form, and, at the same time, flip-flop P of the same register contains the least significant bit of the same number, in binary form.

As should be apparent from columns A through F in FIG. 7, the data word, contained in flip-flops A through F, is cycled through the shift register 20 once every code bit period, so that during the sixth clock period (when *L*, *M* and *N* are 001, respectively) the most significant bit and the least significant bit are in flip-flops A and B, respectively. Consequently, during the next clock period, namely the first clock period of the next code bit period, the most significant bit and least significant bit are against stored in flip-flops F and A, respectively. The content of the flip-flops P through U is also advanced by one stage per clock period. However, since register 30, consisting of flip-flops P through U is only a five-stage shift register, and there are six clock periods per code bit period, one of the six clock pulses per code bit period must be disabled. This is done by utilizing gate 35 (see FIG. 3) to disable the register 30 from advancing the content of its various stages therein, in response to the clock pulse supplied thereto.

The binary counting produced by register 30 in conjunction with the inversion-controlling flip-flop I, is accomplished by using the following algorithm:

1. Starting with the least significant bit, then the second least significant bit, etc., change all ones to zeros until the first zero is detected.
2. Change that zero to a one.
3. Do not alter any of the bits in the subsequent, more significant positions.

The changing or inverting is controlled by flip-flop I and accomplished by gates 31, 32 and 33. For a more complete explanation of the implementation of the algorithm by means of register 30 (flip-flops U through P), shift register 50 (flip-flops *L*, *M* and *N*) and the flip-flop I, reference is made to FIG. 8 which is in table form showing the binary states of the various flip-flops during the six clock periods of each of code bit numbers or periods 0, 1, 14, 30 and 31. As seen therefrom, during code bit period O, during the first clock period, a zero, in binary form (00000) is stored in the shift register consisting of U through P. In accordance with the algorithm, since P stores a O, during the next code period when *L*, *M* and *N* = 100, the zero (0) is changed to a one (1) and is stored in U and flip-flop I is reset (from 1 to a 0). Thereafter, the content of U through P is advanced at the end of each clock period (except at the end of the fifth), so that in the sixth clock period, when *L*, *M* and *N* = 0, 0, 1, respectively, U through P store the logic combination of 00010. Then, at the start of the next clock period, representing the first clock period of the next code bit number or period, the content of U through P is again advanced by one stage, so that at the start of this code bit period a one, in binary form (00001) is stored in U through P. Also, flip-flop I is set again to contain a logic one. This counting sequence continues until, at the end of code bit period number 31 when *L*, *M* and *N* are 0, 0 and 1, respectively, flip-flops U through P store the logic combination 00001. Consequently, when the next clock pulse is received, all zeros are stored in U through P to represent, in binary form, a code bit number O.

From the foregoing it should be seen that during the first five of the six clock periods of each code bit period, the first five bits of the data word, starting with the least significant bit are sequentially stored in flip-flop A. Whether the bit is a logic 1 or 0 is indicated at the output of gate 23 (see FIG. 2), the output being represented by $\beta$. Likewise, during the first five clock periods of each code bit period, the various bits which represent the code bit number, in binary form, are sequentially stored in flip-flop P whose binary state, is indicated by the output of gate 33 and is represented by the letter $\alpha$. Since, as hereinbefore explained in conjunction with Table 2, the decision to incorporate any of the data word bits in the modulo-2 sum to produce the bit in the biorthogonal code is a function of the code bit number, it is the outputs $\alpha$ and $\beta$ which are used to control the toggling of flip-flop G, during these clock periods. The output $\alpha$ is also supplied to flip-flop K whose function, in essence, is to count the number of logic zeros in the code bit number.

The manner in which the outputs $\alpha$, $\beta$ and the binary state of flip-flop K are used to obtain the code bit in the biorthogonal code, using flip-flop G and the gates 61 through 65 in front of it, may now be explained. Briefly, at the start of each cycle period, G is reset. It is wired to toggle whenever the output of the OR gate 63 to the left of it is a logic one. That gate is a 1 whenever any of the following conditions apply:

1. Data bit *a* is a one and the code bit number is even (i.e., $\alpha$ and $\beta$ are both one during $LMN=000$).
2. Data bit *b* is a one and the code bit number is the first two of a group of four (i.e., $\alpha$ and $\beta$ are both one during $LMN=100$).
3. Data bit *c* is a one and the code bit number is the first four of a group of eight (i.e., $\alpha$ and $\beta$ are both one during $LMN=110$).
4. Data bit *d* is a one and the code bit number is the first eight of a group of 16 (i.e., $\alpha$1 and $\beta$ are both one during $LMN=111$).
5. Data bit *e* is a one and the code bit number is one of the first 16 (i.e., $\alpha$ and $\beta$ are both one during $LMN=011$).
6. Data bit *f* is one and the code bit number, in binary form, has an even number of zeros (i.e., K is zero and $\beta$ is one during $LMN=001$; *the even number of zeros is indicated by the fact that the K flip-flop, after the reset during* $LMN=000$, *toggled an even number of times in response to the* $\alpha$ *input*).

If the OR gate 63, leading to G, has been a one an odd number of times, G will have toggled accordingly and will be a one at the end of the code bit period; the opposite is true if the gate was one an even number of times.

Ignoring for the present the function of the comma free code shift register 40 shown in FIG. 4 and the function of flip-flop H in FIG. 6, from the foregoing it should be appreciated that the algorithm, necessary to obtain a code word in the biorthogonal code from a 6-bit data word is implementable with a single set of modulo-2 adders (G and related gates). This is true since the modulo-2 summations of the various data word bits, necessary to produce the code word bits is not done in parallel but, rather, sequentially during six successive clock periods, which define each code bit period. The serial operation is realizable by cycling the data word through shift register 20 once every code bit period, while at the same time the code bit number, in binary form, which is in shift register 30, is similarly cycled. During each of the first five clock periods, the contents (binary states) of flip-flops A and P are used, while during the sixth period the contents of A and K are utilized.

As previously stated, once the bit of a code word in the biorthogonal code is obtained as the output of G, the corresponding bit of the code word in the comma free biorthogonal code is obtained by mod-2 adding the output of G with the output of Z (FIG. 4). This is achieved by flip-flop H and gates 66, 67 and 68, in front of it.

After a complete code word is generated during a succession of 32 code bit periods, flip-flop J is set in the last clock bit period to enable, by means of gate 22 (FIG. 2), a new data word to be clocked in while at the same time resetting the comma free vector code generator 40 (FIG. 4) to an initial state in order to produce during the next 32 code bit periods the desired comma free vector code as the output of Z.

In the particular implementation shown in FIG. 6, the logic controlling flip-flop J is such that J will be reset during all code bit periods except the 31st. This would normally be accomplished very simply using a s-input logic gate, but hardware considerations dictated the use of 2-input gates. From FIG. 8 it is seen that during the last five of the six clock periods of code bit 30, U, S and P are binary ones, implying that the $C_D$ input of flip-flop J is a one, i.e., $C_D$ is inactive, and the $C_c$ input is a ZERO, i.e., $C_c$ is inactive, meanwhile the $S_c$ input is active (logic one) until the fifth clock period. When both of the $S_c$ and $C_c$ inputs are inactive at the clock negative transistion, the state of the flip-flop is determined by which input was last active. Thus, in the 31st. code bit period $S_c$ is active last, causing the J flip-flop to be set. This condition for setting the flip-flop is not satisfied in any other code bit periods.

Although particular embodiments of the invention have been described and illustrated herein, it is recognized that modifications and variations may readily occur to those skilled in the art and, consequently, it is intended that the claims be interpreted to cover such modifications and equivalents.

I claim:

1. An encoder of the type for converting an *m*-bit data word into a corresponding *n*-bit code word herein $n=2^{(m11)}$, 1), the encoder 2 clock means for defining *m* clock periods during each of a sequence of *n* code bit periods;

first means for storing said *m*-bit data word and for cycling said data word therethrough during the *m* clock periods of each code bit period;

second means for storing, during each code bit period, a code bit number in binary form corresponding to the code bit in said sequence to be produced, and for cycling said number therethrough during each code bit period; and control means coupled to said first and second means for utilizing the contents of parts thereof during each of said *m* clock periods, defined by said clock means to provide at the end of each code bit period a code bit in said *n*-bit code word, as a function of the data word and the binary representation of the code bit number in said second means.

2. The encoder as recited in claim 1 wherein said second means comprises a shift register of *m*-1 stages and said first means comprises and *m*-stage shift register.

3. The encoder as recited in claim 2 wherein said control means includes a single bistable element whose output at the end of each code bit period is either a logic one or a logic zero representing the code bit at the end of each code bit period.

4. The encoder as recited in claim 3 wherein said control means includes a plurality of gating means, responsive to the binary states of the least significant stages of the shift registers of said first and second means during at least some of the clock periods of each code bit periods for controlling the state of said single bistable element.

5. The encoder as recited in claim 4 wherein $m=6$, $n=32$, and said code bit period sequence includes periods O through 31 with said second means storing an 0 through 31 in binary form in the 5-stage shift register of said second means during the code bit periods 0 through 31 respectively, with said control means responding during each of the clock periods of each code bit period to at least the state of the least significant stage of said first means shift register to control the state of said single bistable element as a function thereof.

6. The encoder as recited in claim 5 wherein said control means include means for performing modulo-2 summation on from one to five of the data word bits for controlling the final state of said bistable element at the end of each code bit period.

7. The encoder as recited in claim 6 wherein the six data word bits are definable as $a$—$f$, $a$, being the least significant bit, and said control means incorporate in the modulo-2 summation said bit $a$, during all even-numbered code bit periods, said $b$ bit for the first two of each group of four code bit periods, the first group starting with period 0, said $c$ bit during the first four of each group of eight code bit periods, said $d$ bit during the first eight of both groups of 16 code bit periods, said $e$ bit during the first 15 code bit periods 0—15, and said $f$ bit during each code bit period whose number in binary form includes an even number of zeros.

8. The encoder as recited in claim 4 further including generating means for generating during each of said code bit periods 0—31 a different bit of a preselected 32-bit code word, and means for logically combining, at the end of each code bit period, the code bits from said generating means and said single bistable element.

The encoder as recited in claim 8 wherein said control means include means for performing modulo-2 summation on from one to five of the data word bits for controlling the final state of said bistable element at the end of each code bit period.

10. The encoder as recited in claim 9 wherein the six data word bits are definable as $a$—$f$, $a$ being the least significant bit, and said control means incorporate in the modulo-2 summation said bit $a$, during all even-numbered code bit periods, said $b$ bit for the first two of each group of four code bit periods, the first group starting with period 0, said $c$ bit during the first four of each group of eight code bit periods, said $d$ bit during the first eight of both groups of 16 code bit periods, said $e$ bit during the first 15 code bit periods 0—15, and said $f$ bit during each code bit period whose number in binary form includes an even number of zeros.